United States Patent
Freedman

(10) Patent No.: US 9,003,299 B2
(45) Date of Patent: Apr. 7, 2015

(54) EXTENSIBLE APPLICATION STATE PRESERVATION ARCHITECTURE

(71) Applicant: Apple Inc., Cupertino, CA (US)

(72) Inventor: Gordon J. Freedman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 13/656,184

(22) Filed: Oct. 19, 2012

(65) Prior Publication Data

US 2013/0332846 A1     Dec. 12, 2013

Related U.S. Application Data

(60) Provisional application No. 61/657,718, filed on Jun. 8, 2012.

(51) Int. Cl.
*G06F 3/00* (2006.01)
*H01B 7/29* (2006.01)
*G06F 9/44* (2006.01)
*H04L 29/08* (2006.01)
*G06F 11/14* (2006.01)

(52) U.S. Cl.
CPC .............. *H01B 7/292* (2013.01); *G06F 9/4443* (2013.01); *H04L 67/1095* (2013.01); *G06F 11/1438* (2013.01)

(58) Field of Classification Search
CPC ................................................... G06F 9/4443
USPC .................... 715/745, 762; 709/203; 707/779
See application file for complete search history.

(56) References Cited

U.S. PATENT DOCUMENTS

| | | | |
|---|---|---|---|
| 7,827,358 B2 | 11/2010 | Watson et al. | |
| 8,171,137 B1 | 5/2012 | Parks et al. | |
| 8,224,894 B1 * | 7/2012 | Parks et al. | ............... 709/203 |
| 2009/0276547 A1 | 11/2009 | Rosenblatt et al. | |
| 2010/0115053 A1 | 5/2010 | Ryu et al. | |
| 2012/0011237 A1 | 1/2012 | Bagwandeen | |
| 2012/0023411 A1 | 1/2012 | Ryu et al. | |
| 2012/0089940 A1 | 4/2012 | Jang et al. | |

* cited by examiner

*Primary Examiner* — Haoshian Shih
(74) *Attorney, Agent, or Firm* — Blakely, Sokoloff, Taylor & Zafman LLP

(57) ABSTRACT

The preservation of the user interface state of first application on a first device allows, in one embodiment, a user to resume use of at least a portion of the user interface state on a second application on second devices. The first and second applications can be the same or different (with some common user interface UI features or elements and other UI features that are different).

17 Claims, 8 Drawing Sheets

EXTENSIBLE APPLICATION STATE PRESERVATION ARCHITECTURE

This application claims the benefit of U.S. Provisional Patent Application No. 61/657,718, filed on Jun. 8, 2012 and incorporates herein by reference that provisional patent application.

BACKGROUND OF THE INVENTION

The present invention relates to the preservation of a user interface state for an application. Prior application software programs have preserved at least some aspects of their user interface by explicitly saving data about the user interface. Typically, a user specifies preferences and these are saved when the user quits the application or when the preferences are specified. These aspects of the user interface are saved by the application in response to the user's selection of a command in the application or in response to quitting of the application.

Another example of the preservation of user interface is a resume or state restoration feature of the operating system known as Mac OSX version 10.7 (also known as "Lion"). The Cocoa application framework in this version of the Macintosh operating system provides support for an application that decides to save aspects of its user interface. Much of the user interface data of the application is already maintained in Cocoa's application framework, and Cocoa can then cause this user interface data to be saved, when for example, the operating system terminates an application that has been loved to a background state. When the application is relaunched after this termination, then Cocoa and the application can restore the state of the user interface of the application, and this can include the size and position of windows and objects within the windows and scroll positions of content within the windows. The Cocoa application framework provides this preservation for only a single device, such as a user's laptop, that runs the application and the Cocoa application framework.

The prior art also includes systems which synchronize user content between a set of devices controlled by a single user; however, these prior synchronization systems do not synchronize user interface states between applications on different devices of the user.

SUMMARY OF THE DESCRIPTION

One embodiment of the present invention provides the preservation of user interface state across two applications on two different devices. This preservation can be provided by saving a user interface state of a first application on a first device and transmitting information about the saved user interface state through a network interface, on the first device, for delivery to a second device that has a second application which is configured to recreate at least part of the user interface state in the second application on the second device. In one embodiment, the first and the second applications can be the same application operating on their respective devices; in another embodiment, the first application can share some common user interface elements with the second application which also has other or different user interface elements which are not present in the first application. In one embodiment, the first and second applications can both be native applications executing on their respective device and are not web apps. The user interface state which is saved for the first application can be saved in response to an event and can include the state of the set of user interface elements which are selected for saving by the first application. In one embodiment, each of the first and second application selectively decides which of its various user interface elements to save state for; in this embodiment, each application can opt in or opt out of the user interface state preservation system, and this allows the system to be extensible over time as different versions of the applications are created. In one embodiment, the event which causes the saving of the user interface state can be any one of (a) terminating the first application in response to an operating system request on the first device or (b) being terminated by the operating system; or (c) moving the first application (or a window of the first application) to a background state from a front most application state.

In one embodiment, the preserved user interface state can be synchronized across several devices of a user, thereby giving the user a consistent feel over time. For example, the user may take a photo on their smartphone and begin to edit the photo with a photo application on the smartphone, and then become involved in other tasks. While performing the other tasks, the smartphone decides that it needs more memory for the other tasks and kills the photo application on the smartphone. Normally this would reset the user's user interface state, such as the zoom factor and portion (or scroll position) of the photo being edited, etc. But, with at least one embodiment of the present invention, the user interface state can be saved and restored when the user launches the photo application again on the smart phone. Moreover, the user interface state can also be synchronized to other devices associated with the user. For example, if the user resumes editing the photo on a tablet computer using the tablet version of the photo application, the synchronized user interface state from the smart phone can be converted by the photo application on the tablet computer into a user interface configuration which is consistent with the state of the smart phone application but is laid out in a manner suited to the tablet version of the photo application. In one embodiment, the first device and the second device have different form factors, such as different sizes of display devices. For example, in the case of the preservation of user interface state between applications on a smart phone and a tablet computer, the tablet computer can have a larger display device which allows for additional user interface elements to be present in the application, such as a photo application, running on the tablet computer, and those additional user interface elements are not present on the smart phone application which runs on the smart phone. In one embodiment, each device which participates in this preservation can be configured to run a version of the same operating system or different iterations or versions of the same operating system.

In one embodiment, a method of the present invention can also include transmitting a device identifier of the first device through the network interface of the first device for delivery to the second device and transmitting an identifier of the version of the first application through the network interface of the first device for delivery to the second device. These identifiers can be used when determining which features and elements to preserve on each of the respective devices based upon the version identifiers. In one embodiment, the applications can use a set of identifiers in a scoped path list to selectively specify which user interface elements will have their state saved. For example, the first application running on the first device can use a first set of identifiers in a first path list to selectively specify which user interface elements will have their state saved, and the second application can use a second set of identifiers in a second path list to selectively specify which user interface elements will have their state saved. In one embodiment, the first set of identifiers can be different than the second set of identifiers; this is often the case when the first application and the second application have some user interface elements in common while other user interface elements are not common to the two applications.

The user interface state can include one or more of the following user interface states: (a) a scroll position of content within a view; (b) a zoom level or magnification level of content within a view or window; (c) an image rotation amount or an orientation setting such as portrait or landscape; (d) a tab selected from a set of multiple tabs within a windowed view; (e) whether a keyboard is displayed or not displayed on a display device of the first device or the second device; (f) a selection of an item in a list; (g) which user interface element has an input focus, such as a text input focus; or (h) the order of a series of different views traversed over time by the user; etc. In one embodiment, the saving of the user interface states does not include saving user content in a view. In one embodiment, each of the applications on the two different devices can utilize an application framework, provided by an operating system on each device, to save the user interface state. The set of one or more data structures used to save the user interface state can be maintained by the application framework and can include a path list which has identifiers in a scoped list which specify a hierarchy of views. The identifiers are used by each of the applications to selectively specify which of the various user interface elements within an application are to be saved when preserving the user interface state.

In one embodiment according to the present invention, a method of preserving state can also include receiving, through the network interface of the first device, another set of one or more data structures from the second device, wherein another set of one or more data structures represents a user interface state of the second application. Then, the user interface state of the first application is updated based upon the another set of one or more data structures which originated from the second device. This aspect can result from a sequence of operations by the user which begins with the first device and then the user uses the second device to further modify the user interface state and then the user returns to using the first device which has the user interface of the first application on the first device updated based upon changes which occur to the user interface state on the second device.

The embodiments described herein can be implemented as machine readable non-transitory storage media or as methods or as one or more data processing systems.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
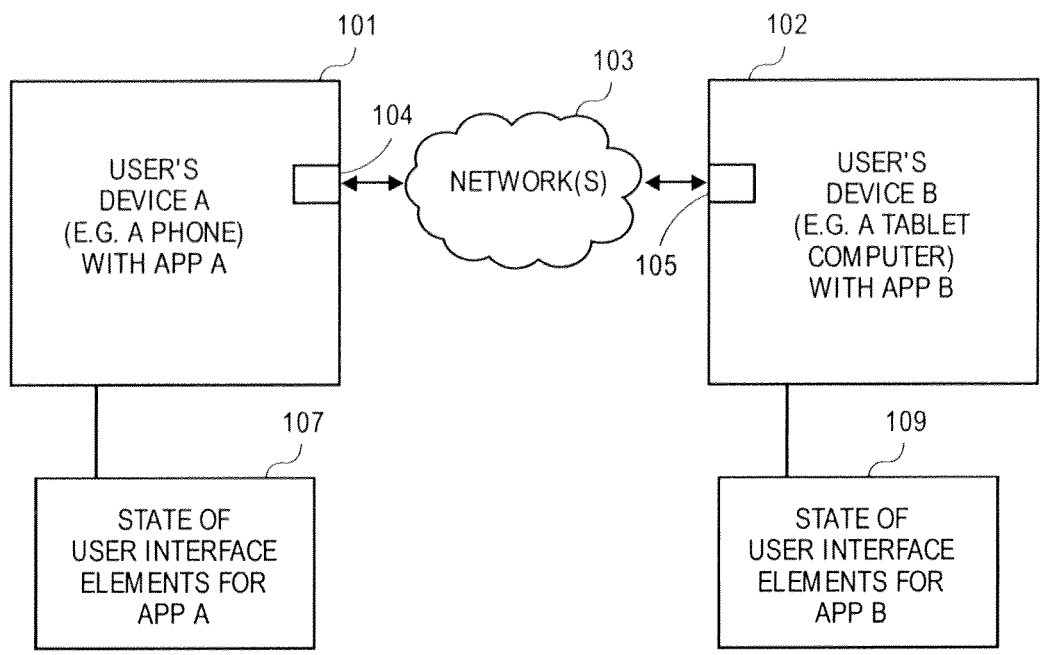
FIG. 1 shows an example of two devices which can exchange information about the state of user interfaces for two applications, one application on one device and the other application on the other device.

Various embodiments and aspects of the inventions be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The preservation of user interface state between two applications on two devices allows a user to begin viewing or editing or otherwise manipulating information, such as a document on one device to achieve a first user interface state on a first device and then be able to continue working with the document on another device and resume at the state of the user interface which is preserved at the first device. For example, a user can take a photo with a smartphone, which can be the first device and begin editing that photo with the smartphone using a photo application which can be considered the first application on the first device. The user can select a zoom level and a scroll position within the zoomed photo; the user can also select an orientation or rotation of the photo and select one or more scroll positions within a view of the photo. Moreover, if the photo application has multiple tabs in its user interface, the particular tab selected from a set of multiple tabs can also be saved when the user interface state of the application on the smartphone is saved. The saving of the user interface state can occur in response to an event such as moving the photo application to the background or in response to the OS's request to kill the photo application. When this occurs, the system and the application can save the state of one or more user interface elements. In one embodiment, each application decides on its own which of the elements to save by providing an identifier, described further below, which in effect toggles on the saving of the user interface element which is identified by the identifier. The saved user interface state data can then be transmitted to another device of the user, such as a tablet computer or a laptop computer which also has a photo editing program which shares some common user interface elements with a photo program or application on the smartphone. The user can then, on the another device, resume editing or otherwise manipulating the photo from the point of the last preserved user interface state, which can include saved zoom level, saved position or scroll position within a view, saved orientation or saved rotation, the tab selected, etc. It will be understood that the state of the user interface which is saved is normally different than the default or initial state of a user interface of the application when the application is first launched or first installed. In other words, the state of the user interface which is saved is the state of the user interface after the user has interacted with the program to modify the default or initial user interface state.

Figure 11:
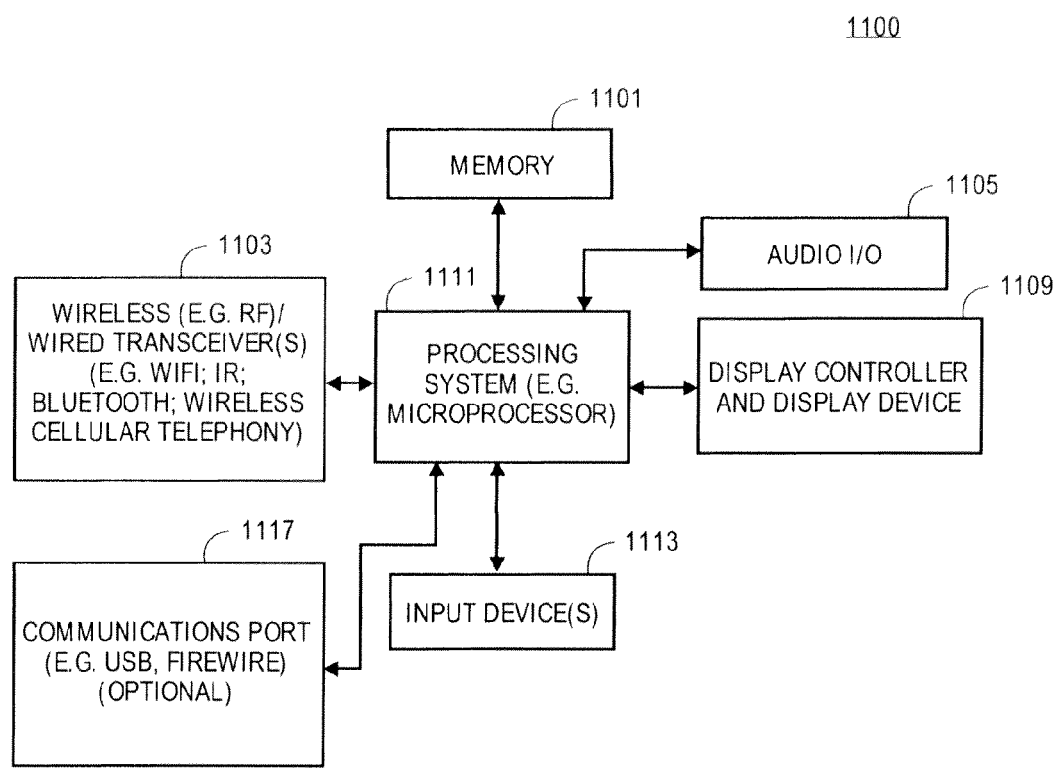
FIG. 11 is a block diagram view of an example of a data processing system which can be used with one or more of the embodiments described herein.

FIG. 1 shows an example of two devices, each with an app and each having a corresponding state of the user interface of the app. It will be understood that the term "app" is an application software program which executes, in conjunction with an operating system, on a data processing system, such as the data processing system shown in FIG. 11. Each of devices 101 and 102 shown in FIG. 1 can be implemented as shown in FIG. 11. Device 101 includes app A and memory for storing state 107 of the user interface elements for app A. In addition, device 101 has a network interface 104, such as a WiFi transceiver or a cellular telephone transceiver. The network interface 104 of device 101 is configured to transmit the preserved user interface (UI) state through the network interface 104 on the first device 101 for delivery to a second device, such as device 102 through one or more networks 103 which can include the internet. The second device 102 can receive, through its network interface 105 the preserved user interface state data and can store that as state 109. When application B on device 102 is launched, it can restore the state of the application for a particular document based upon the preserved state 107 which is received through network interface 105 by the device 102. In this case it is assumed that the user has used device 101 first and has used app A on device 101 first before using app B on device 102. In this case, a time stamp associated with state 107 can indicate to device 102 that the later user interface state data is from device 101 rather than from the last time that app B was run on device 102. In addition to a time stamp, the transfer of user interface state data 107 can also include the transfer or transmitting from device 101 to device 102 a device identifier which identifies device 101 to device 102 and also an identifier of the version of app A, which can be used when restoring the user interface state, particularly when two applications have different user interface elements while also sharing some user interface elements which are common to the two applications. In one embodiment, app A and app B in FIG. 1 could be the same application having entirely the same set of user interface elements in each of their user interfaces. In another embodiment, the two applications can share some elements of the user interface which are common but also include elements which are not common, and the example shown in FIG. 2A provides a specific example of how the state of the user interface can be preserved between two applications which are different but which have some common user interface elements.

Figure 2A:
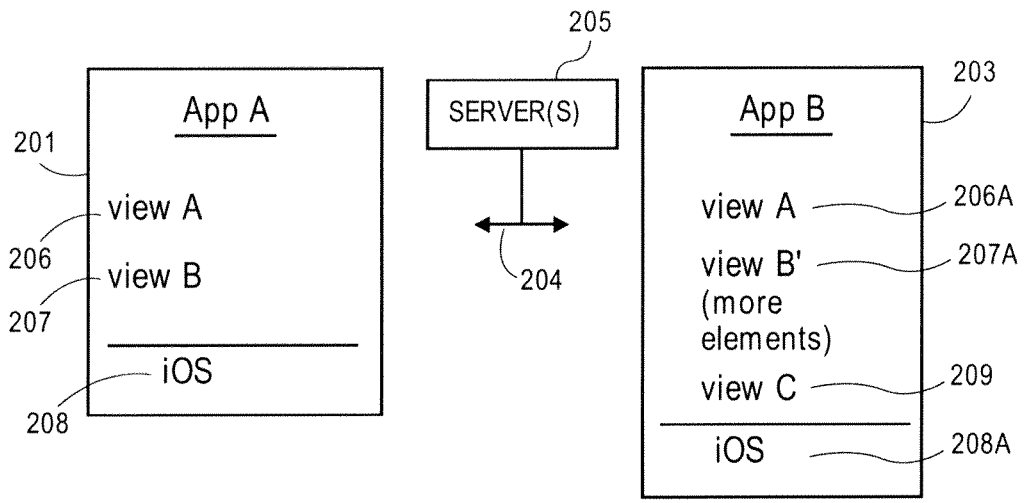
FIG. 2A shows an example of how user interface state information can be exchanged between two different applications which are different but which also share common user interface elements.

FIG. 2A shows two different applications, app A and app B which have some user interface elements which are common to both applications but the applications are not identical. Even though they are not identical, it is still possible to synchronize or preserve the state of the user interface to the level at which they are common. In the example shown in FIG. 2A, view A is the same between the two applications app A and app B and therefore this is a common set of user interface elements. View A 206 in app 201 will have the same user interface elements as vie A 206A in app 203 and hence these elements can be synchronized. The user interface state is synchronized or preserved between the two apps by the exchange of state data through one or more servers 205 which is coupled to one or more networks 204. App 201 also includes a view 207 which is similar to view 207A except that view 207A has more elements than in vie 207 but does include some elements which are also in view 207. The elements which are common between views 207 and 207A can be synchronized between the two apps on the two devices. App 203 also includes view C 209 which is not present at all in app 201. In this embodiment, app B can save more UI state data than is needed by app A (when app B's state is used to restore app A's state) but app B can still use that additional saved UI state data when app B's state is restored. View 209 could be a separate panel or tiled window or other user interface elements which can be displayed on a device running app 203 because that device has a larger display than the device running app 201. In one embodiment, the two different devices can have different form factors, such as different display sizes. For example, one device can be a smartphone which has a display device which is smaller than a display device of a tablet computer or a laptop computer, etc. In the example shown in FIG. 2A, each device runs the same operating system (shown as the iOS operating system from Apple Inc. of Cupertino, Calif.); in one embodiment, the two devices may run different versions or iterations of the same operating system, such as one device could be running version 4.5 of the iOS operating system while another device is running version 4.6 of the iOS operating system. Also, in another embodiment, each device can run different versions of the same application; for app 1 on device 1 is iPhoto version 4.7 and app 2 on device 2 is iPhoto version 5.2.

The one or more servers 205 can store the state data, such as state data 107 or state data 109 through a synchronization process in which the server or set of servers 205 receive the state data of the user interface of a particular application as part of the synchronization process for synchronizing content between two or more devices, such as device 101 and 102. The synchronization of user interface state (such as state data 107 and 109) between two devices can be part of a larger synchronization process which involves also synchronizing other data (such as contact entries, calendar entries, email, music or other content) between the two devices, and this larger synchronization process can be performed through the servers 205, which in one embodiment, can be a cloud based storage service (e.g. iCloud from Apple Inc.) that stores user data (e.g. contacts, address books, calendar entries, music or other content) from two or more devices of one or more users.

This storage service, hosted by servers 205, can in one embodiment, provide backup services for user data in case of a device failure (or other loss of data) in which user data is lost at a device; the backup service can be used to restore the data that was lost in a process in which user data stored on the servers 205 is transmitted back to a device that has failed to restore the lost data at the device. The servers 205 can use timestamp data to determine the most recent use of the two applications, such as app A or app B shown in FIG. 2A which can be the same as app A and app B shown in FIG. 1. These timestamps can be used to determine which of the set of user interface states is the most recent set for a particular pair of applications, such as app 201 and app 203. In one embodiment, a cloud based storage service can keep track of the applications on each device which is involved in the synchronization and can allow a user to specify which of those applications the user wants to synchronize their user interface state. For example, a user can be given options to select which of a user's devices and which of the applications on those devices will have their UI state synchronized.

Figure 2B:
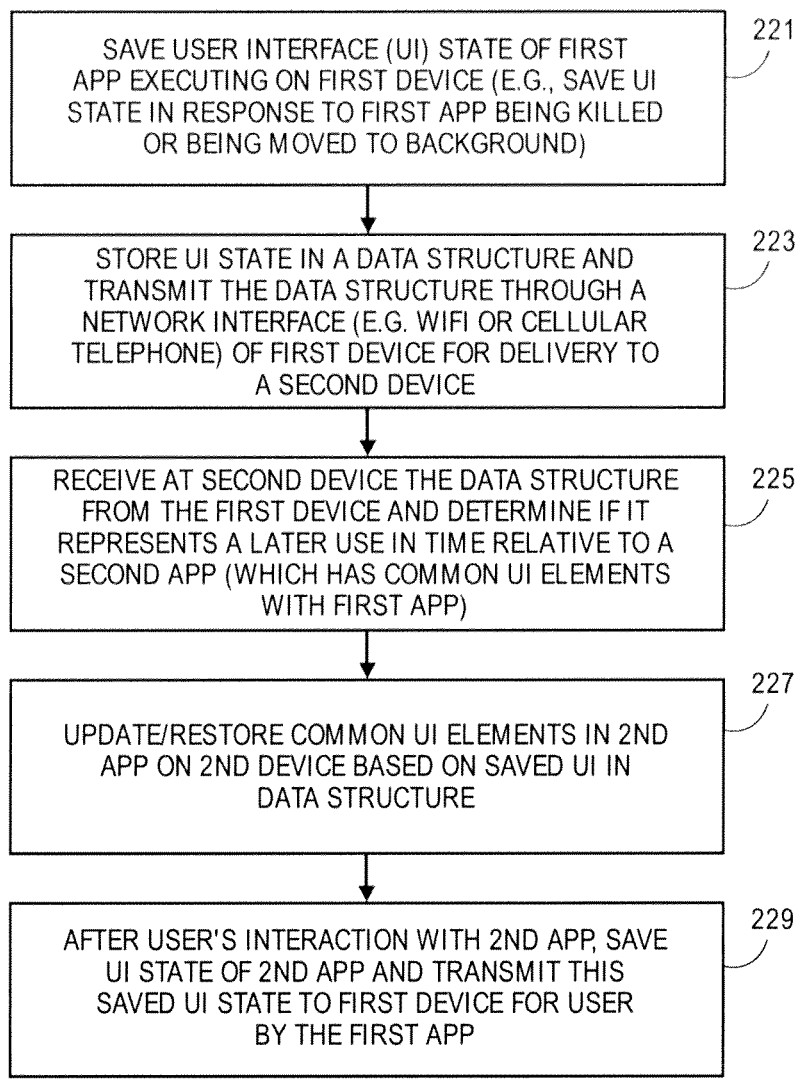
FIG. 2B is a flowchart which illustrates a method according to one embodiment of the present invention.

FIG. 2B shows a method according to one embodiment of the present invention in which user interface state data can be saved on one device and then sent to and used at another device for a same or different application which was used on the first device. The method shown in FIG. 2B involves a user scenario in which the user starts with the first application on a first device, such as an iPhone, and then uses a second application on a second device, such as an iPad; in this user scenario, the two devices have different form factors with the same operating system or different versions or iterations of the operating system (OS). The first and the second app can have identical user interfaces or, as the case shown in FIG. 2A different user interfaces but with common elements which can be preserved or synchronized between uses of the two applications. In operation 221, a data processing system saves a user interface state of the first application which is executing on the first device. This saving of user interface state can occur in response to an event which can be the first application being killed (e.g., because of low available system memory in the first device) or being moved to the background state from a front most application state, etc. The killing of the application can be in response to a request from the operating system to terminate the application (e.g., because of low available system memory in the first device) or can occur automatically by the operating system terminating in the application (e.g., because of low available system memory in the first device) without requesting involvement of the application in the process of terminating the application. Memory management in some devices can involve techniques that terminate background applications when a memory usage level becomes too high; the use of these techniques are described in U.S. Pat. No. 7,827,358 which is hereby incorporated herein by reference. Memory usage level can be inversely related to a measure of the free volatile system memory (e.g. Dynamic Random Access Memory-DRAM); volatile system memory is typically used to store the executable code of the OS and the executable code of the applications which are running along with data used by the OS and those applications. When a user concurrently runs multiple applications, memory usage level can become too high (and as a result the level of free volatile system becomes low), and this can cause the OS to terminate or kill applications that have been moved to a background state (so that they are no longer the front most application). In one embodiment, these techniques of terminating background applications are used on devices that do not employ a virtual memory (VM) system in which a page swapping component of the VM system swaps pages of memory in and out of volatile memory from a non-volatile backing store memory. These techniques can be particularly useful in such devices that do not employ such a VM system because there is less memory to use. In one embodiment, operation 221 does not save user content for the first app; rather, the first app is responsible for saving user content such as text entered by users, etc. In other words, in one embodiment operation 221 involves saving the user interface state, such as the position of scroll bars, zoom or magnification level within a view, etc. rather than the variable content of the document which is assumed to be saved separately by the application. In one embodiment (such as the example shown in FIG. 9, operation 905), the UI state of the application is not saved if the application cannot run in the background; in this case, the method of FIG. 2B includes an operation to check whether the application can run in the background and if it cannot then the UI state of the application is not saved.

Then in operation 223, the first device stores the user interface state in a data structure and transmits that data structure through a network interface of the first device for delivery to a second device. In one embodiment, the network interface can be a WiFi transceiver or a cellular telephone transceiver or other forms of wireless transceivers or wired transceivers. The transmission of the data structure in operation 223 can occur in response to the event in operation 221 or when user data (such as contact entries, calendar entries, email, music, etc.) and other data on the first device is synchronized to a server in the cloud, such as an iCloud backup system which stores user data on one or more servers through one or more networks as is known in the art. The data structure containing the user interface state can be also stored as part of this backup operation and then received by a second device in operation 225 in which the second device receives the data structure from the first device through one or more servers contained in one or more networks, such as network 103 or network 204 in FIG. 1 and FIG. 2A respectively. The receipt of the data structure containing the UI state by the second device in operation 225 can be part of a larger synchronization process noted above in which user data (such as contact entries, calendar entries, email, music, and other user data and content) is synchronized, through one or more networked servers (in a "cloud" such as the iCloud backup service); this receipt of the data structure containing the UI state can occur as part of the larger synchronization process and the second device can thereby receive this data structure as well as updated, new or modified contact entries, calendar entries, etc. during and as part of this larger synchronization process. Also in operation 225, the second device determines if the data structure represents a later use in time relative to the use of a second application on the second device which has common user interface elements with the first application. This determination can be performed by using a timestamp which is received with or in the data structure which stores the user interface state. The timestamp allows the second device to determine whether the data structure from operation 223 is in fact the most recent use of the two linked applications and if it is, then, in operation 227, the second device updates or restores the common user interface elements in the second application on the second device based upon the saved user interface state from the data structure stored in operation 223. This provides the user with the ability to continue editing a photo or other content which was previously edited on the first device, and to continue the edits, on the second device, from the last user interface state on the first device rather than beginning from a default user interface state on the second device. Operation 229 can then be performed after the user's application with the second application on the second device. In operation 229, the user interface state of the second application can then be saved (for example, in response to an event as described above) and then transmitted to the first device for use by the first application should the user revert back to using the first device to continue to view, edit, or manipulate the content which has been processed by both the first device and the second device through the method shown in FIG. 2B. In one embodiment, the transmission in operation 229 is through one or more network based backup servers (e.g. the iCloud backup service) and this transmission is part of a larger synchronization process that synchronizes (through, for example, the iCloud backup service) user content (e.g. contact entries, calendar entries, music, etc.) and the UI data structures (e.g., 107 and 109) between the first and the second devices. U.S. patent application Ser. No. 13/227,342, filed Sep. 7, 2011 and entitled "Methods and Apparatus for Power State Based Backup" describes an example of a network based backup service and this application is hereby incorporated herein by reference. This process can, in one embodiment, continue over time such that the first device is used and then the second device is used and then the first device is used, and then the second device is used and so on etc. and this process can continue automatically over time, in one embodiment, as the network based backup service (e.g., iCloud backup service) continues to synchronize both user data (e.g. contact entries, calendar entries, music, etc.) and the UI data structures (e.g. 107 and 109) over time.

Figure 3:
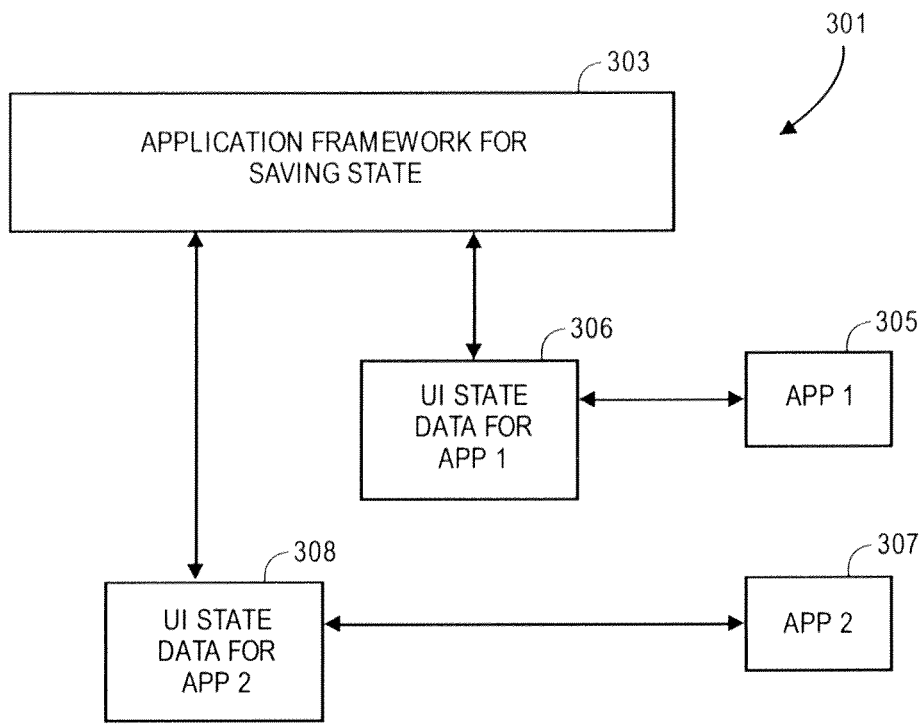
FIG. 3 is a block diagram view of an architecture which allows for the preservation of user interface state for one or more applications in a system.
Figure 4:
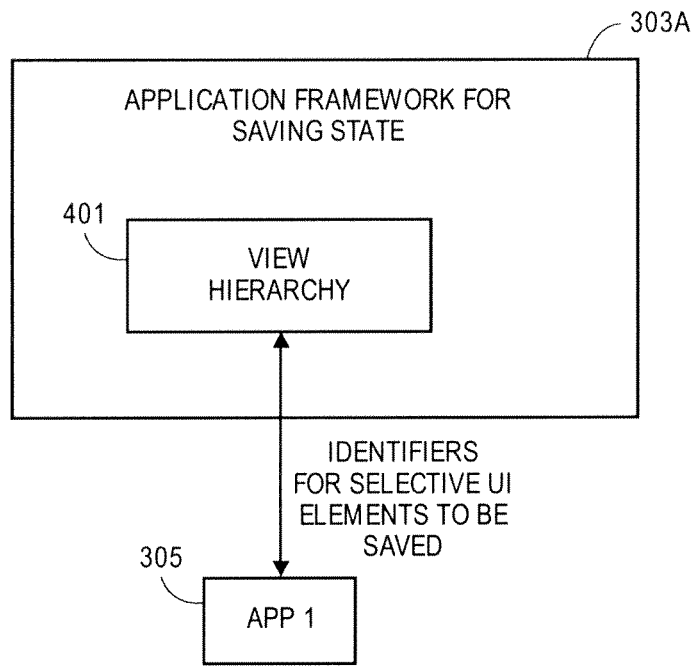
FIG. 4 is a block diagram view of an architecture for using an application framework for saving user interface state information.

In one embodiment, one or more applications on a device can use an application framework, such as application framework 303 in the architecture 301 shown in FIG. 3. Each device, such as device 101 and 102 can include such an architecture that uses an application framework for saving use interface state. The application framework, in one embodiment, can be a software library which provides a software layer to implement standard user interface elements and to cause them to be displayed on a display device. In this case, the application framework will often have the user interface state available to it by virtue of the fact that the framework causes the display of the user interface for one or more applications, such as applications 305 and 307 shown in FIG. 3. The application framework 303 can save the state of the user interface for one or more applications, such as UI state 306 and UI state 308 respectively for applications 305 and 307. As shown in FIG. 4, the application framework, such as framework 303A can use a view hierarchy 401 which is used to organize the information about the user interface state in a hierarchy that can match the hierarchy used by the framework for creating and causing a display of the user interface.

Figure 5:
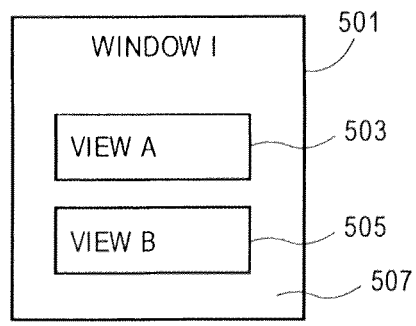
FIG. 5 shows an example of a user interface which can have its state saved.
Figure 7:
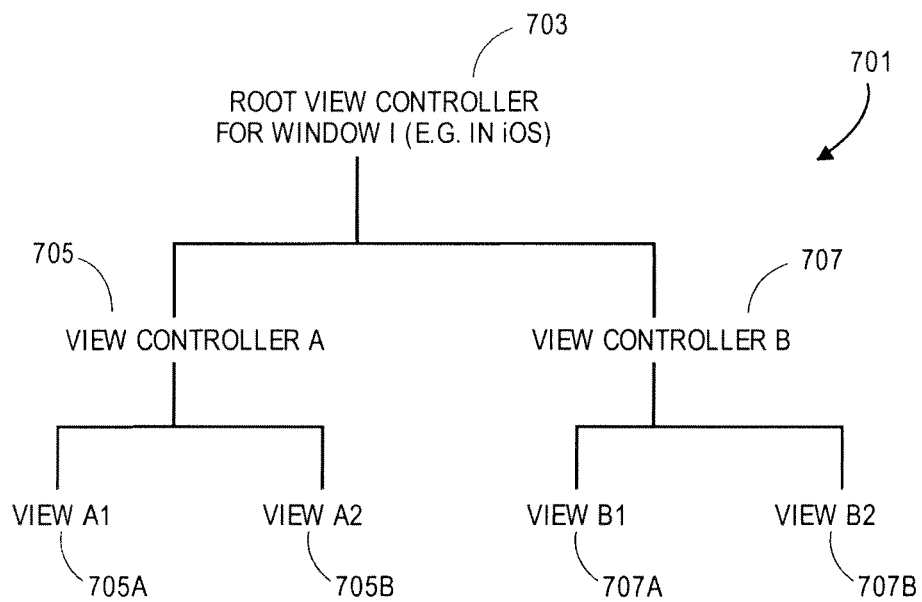
FIG. 7 shows a tree or hierarchy of views according to one embodiment of the present invention which can be used in conjunction with an application framework to provide for the preservation of user interface states between applications.

FIG. 7 shows an example of the view hierarchy for the window (or view controller and its views) 505 shown in FIG. 5. In one embodiment, each application can decide on its own how much of its user interface state to save by providing identifiers for only those user interface elements that are to be saved by the application framework. Hence, an application developer can decide to save none of the state or only a portion of the state for a portion for the respective user interface elements. In other words, a developer of an application can opt in or opt out on an element by element basis. In one embodiment, this opting in or opting out is performed by the use of identifiers which in effect toggle on or off the saving of user interface elements. By selectively opting in on some UI elements and opting out on others, a developer can selectively synchronize some elements and not others and then at a later time the developer can opt-in on the others to add those to the synchronization of the UI state; in this way, the synchronization of UI elements can be extended over time and is therefore extensible by virtue of selective use of these identifiers. These identifiers are provided in one embodiment by each application, such as application 305, to the application framework, such as application framework 303A, which can be similar to application framework 303. One benefit of using a view hierarchy means that a developer can use the same identifier for multiple view controllers, and developers can use the same identifier for multiple views as long as they are not in the same view controller. In one embodiment, all objects have an identifier, and a scoped "identifier path" or path list is built which starts from the top most view controller in the window, which in the case of window 501 is view controller 703 shown in FIG. 7 and descends down to the subview controllers (either a container controller's children or presented view controllers) and then to views in these view controllers. Saving and restoring of user interface state can occur in multiple passes, with breadth first, which in the case of FIG. 7 is a root view controller 703. In those embodiments in which an application delegate is used with the application framework the state of the application delegate is saved and, then the view controllers and then the views are saved. For example, in the case of FIG. 7, after the root view controller 703 is saved, then the view controller A and the view controller B 705 and 707 respectively, are saved, and then finally the views within each of the respective view controllers is saved. The root view controller 703 shown in FIG. 7 is the view controller for window 501 and it controls or contains view controllers 705 and 707 which correspond respectively with view 503 and 505 shown in FIG. 5. View A may be a scrollable area within window 501 and view B may be a zoomable area in which the magnification level of an image can be changed by a user. View B 505 is controlled by view controller B 707. Each of these view controllers 705 and 707 respectively include one or more views within their respective areas in the user interface. In the example shown in FIG. 7, view 705A and 705B are contained within view 505 shown in FIG. 5 while views 707A and 707B are contained within view 505. In addition, the window 501 includes a background 507 which can be controlled by root view controller 703.

Figure 6:
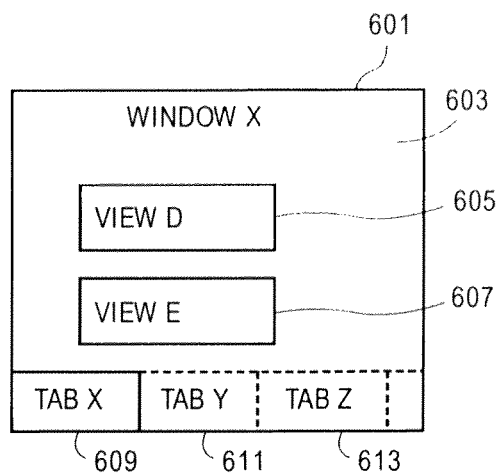
FIG. 6 is another example of a user interface which can have its state saved.

FIG. 6 shows another example of a user interface which uses tabs 609, 611, and 613 to move from different windows or view controllers as is known in the art; for example, the iOS user interface on the iPhone often employs tabbed views which have tabs which are similar to tabs 609, 611, and 613. The selection of a particular tab corresponds to a selection of a particular window or view controller, such as window or view controller 601 which is window X and corresponds to tab X 609. The user interface shown in FIG. 6 also includes a background 603 and two views, view 605 and view 607 which can be implemented through a view hierarchy and which can have their states saved in the manner described herein.

Figure 8:
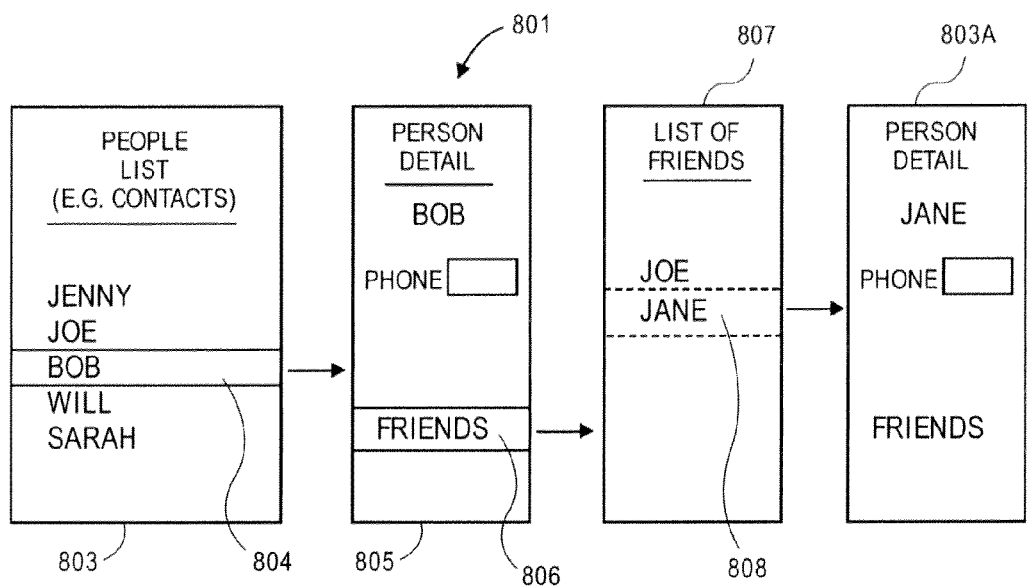
FIG. 8 shows the sequence of different views or windows over time as a user uses a particular application, in this case a contacts or address book application.

FIG. 8 shows an example of one embodiment in which the sequence of operations or access by a user to a series of windows (or view controllers) is saved as part of saving the user interface state. The saving of a sequence is effectively saving a user's session with an application; this session can show what a user did in what sequence in the application. The example shown in FIG. 8 is a contacts or address book application which can contain contact information for one or more people, and which can include phone numbers, email addresses, street addresses, list of friends, and other information for each person. As shown in the sequence 801, the user can begin at the people list 803 which lists various contacts in the user's address book or contact list. As shown in FIG. 8, the user has selected item 804 which is the name Bob and as a result the system displays person detail window or view controller 805 containing information about Bob, such as his phone number, etc. Window or view controller 805 replaces window or view controller 803 which is no longer displayed. One option which is available in window or view controller 805 is a friends 806 user interface selection. When the user selects that option, this results in the display of window or view controller 807 which shows a list of friends of Bob, which includes item 808 which can be selected by the user to cause the presentation of the person detail window or view controller 803A showing information about Jane. A scoped path list with restore identifiers for each window can be saved as each window is moved into the background through the sequence shown in FIG. 8. The order of the scoped path list or lists can also be saved such that the restored use interface state can begin with window or view controller 803A and allow the user to progress backwards in time to window or view controller 807 and then to window or view controller 805 and then to window or vie controller 803, and in each case the preserved user interface state for each of those windows is restored according to one embodiment of the present invention. In an embodiment such as the one illustrated in FIG. 8, a device, by saving such UI state, can track how the user arrived at where they are—if they have navigated from an artist view (e.g., in a media player such as iTunes) to an album view to a specific song, an embodiment can save not only the state of the playing of that song in a song view but also that they arrived there via the album view and then the artist views—and preserve the state if the user backs up from the song view. Also, in an embodiment, other states that are not always visible, such as a view controller and its views that are below another view controller that covers the display's screen, can have its UI states saved also such that when the another view controller is dismissed (and hence removed from the display's screen) the correct and preserved state of the previously hidden view controller is preserved. This example can occur in the tabbed UI of iOS on an iPhone or iPad where various tabs at the bottom of the display's screen can be selected to view or hide different view controllers and their views.

Figure 9:
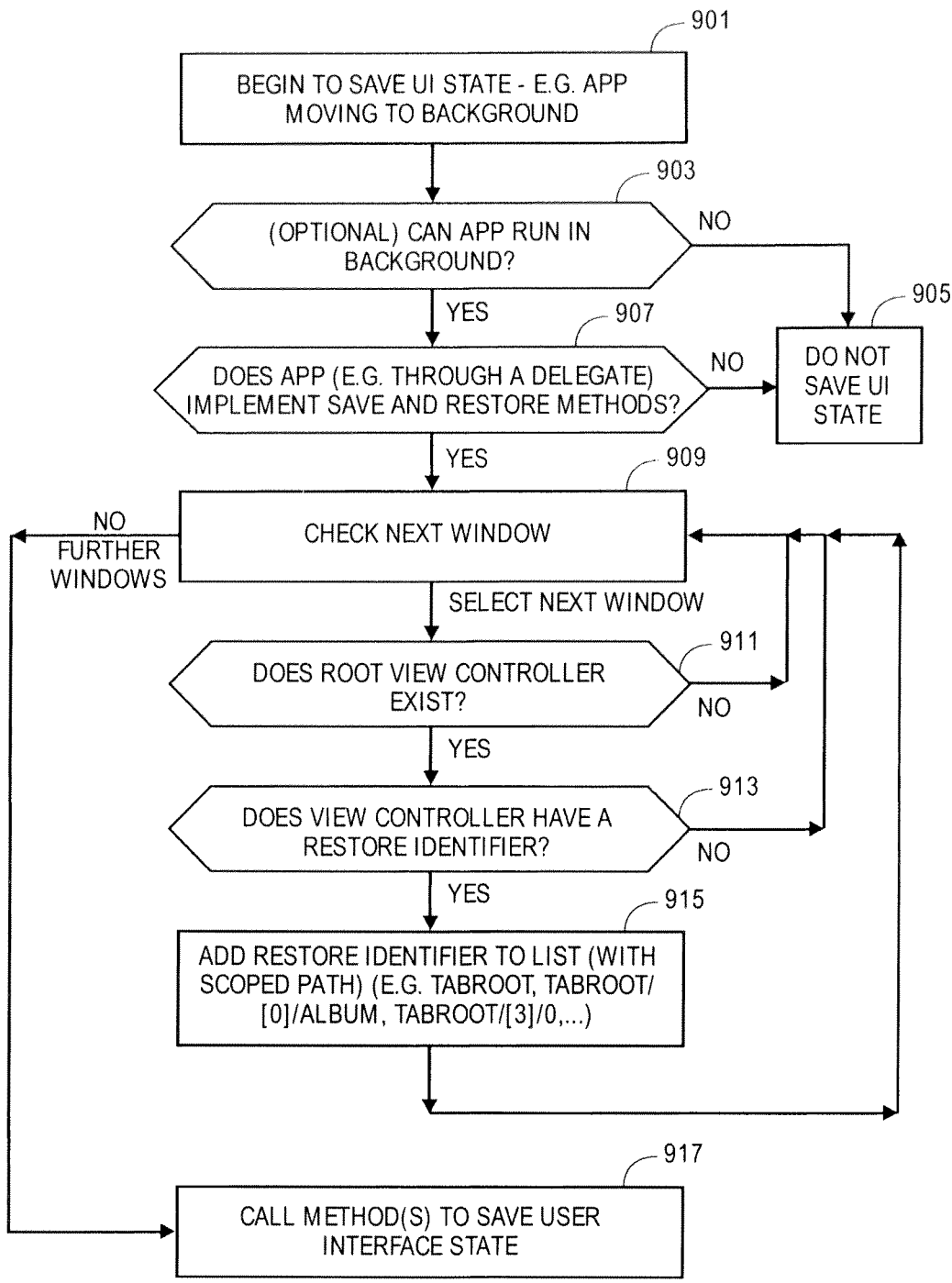
FIG. 9 is a flowchart which illustrates a method according to one embodiment of the present invention.

FIG. 9 shows an example of a detailed method according to one embodiment for determining whether and what to save with respect to the user interface state for an application. The method can begin in operation 901 which can occur in response to an event which causes the saving of the user interface state, such as the app being moved to the background or a window in the app being moved to the background or the application being killed either by a request from the operating system or by the operating system without a request to the application. In operation 903, it is determined whether or not the application can run in the background. This operation 903 is optional and is used those embodiments in which restoration of state is not performed for applications that cannot run in the background. If it is determined in operation 903 that the application cannot run in the background, then the state is not saved as indicated by operation 905. If the application can run in the background in one embodiment, then the process proceeds to operation 907 in which it is determined whether or not the application can implement save and restore methods. If the application cannot, then the process ends in operation 905 in which the use interface state for the application is not saved; on the other hand, if it can implement save and restore methods then operation 909 checks for the next window; if there are no further windows, the method proceeds to operation 917 in which one or more methods are called to save the user interface state, and this would typically occur at the end of processing view controllers and views within at least one window. The next window is selected in operation 909 when there are windows to further process, which results in the decision operation 911 which determines whether a root view controller exists. If one does, then processing proceeds to operation 913, otherwise it returns back to operation 909 to check for the next window. In operation 913, it is determined whether or not the view controller has a restore identifier. This restore identifier can be similar to the identifiers described herein which are used by an application to selectively decide whether or not to save the user interface state for a particular user interface element. If the view controller does not have such a restore identifier, then processing returns back to operation 909 otherwise, processing proceeds to operation 915 in which the restore identifier found in operation 913 is added to a list, such as a scoped identifier path list, an example of which is provided in operation 915 in FIG. 9. After operation 915, processing returns back to operation 909 to check for the next window; if no further windows exist, then processing proceeds from operation 909 to operation 917 which cause one or more methods to save the user interface state.

Figure 10:
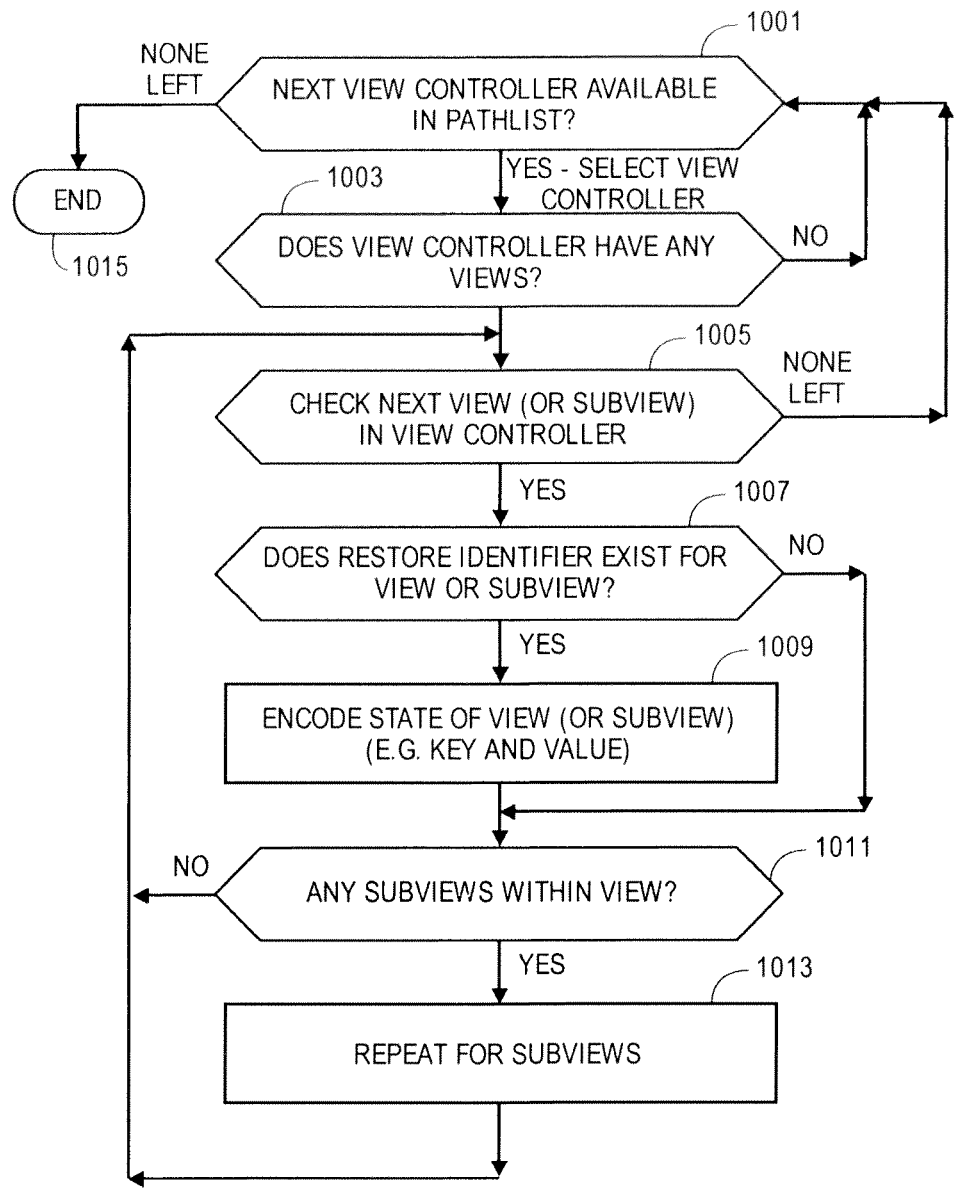
FIG. 10 is a flow chart which illustrates a method according to one embodiment of the present invention for preserving user interface state for an application.

FIG. 10 shows an example of a method which can be used to save a user interface state according to one embodiment of the present invention.

The method shown in FIG. 10 can begin in operation 1001 which determines whether or not a view controller still remains to be processed in this method. If a view controller still remains to be processed, then operation 1003 follows operation 1001 otherwise the methods ends at operation 1015. In operation 1003, the device determines whether the view controller has any views. If it does not, processing returns back to operation 1001 to determine whether any further view controllers remain to be processed. If the view controller does have views, then operation 1005 follows operation 1003. In operation 1005, the system checks the next view or subview in the view controller to determine whether there are any views or subviews in the view controller which need to be processed in the method of FIG. 10. If none are left, then processing returns back to operation 1001. If additional views or subviews remain to be processed in the method of FIG. 10, then operation 1007 follows operation 1005. In operation 1007, it is determined whether or not a restore identifier exists for the particular selected view or subview. If the restore identifier does not exist, processing proceeds to operation 1011, and otherwise processing proceeds from operation 1007 to 1009 in which the state of the view is encoded. The encoding of the state of the view or subview in operation 1009 can, in one embodiment, use a key and value encoding where the key represents an identifier of the user interface element, such as an identifier used by an application framework 303 or 303A and a value which represents the state of the user interface element, such as a position of the scroll within a view, or a zoom or magnification level or which item in a list are selected, etc. After encoding the state of view or subview in operation 1009, the system proceeds to operation 1011 in which it is determined whether any subviews exist within a view. If there are no subviews, then processing returns back to operation 1005, and if there are subviews then processing proceeds to operation 1013 in which the process is repeated for subviews by looping back to operation 1005.

The restoration of user interface state from one or more data structures that contain user interface state information can be performed in multiple passes and can proceed in a manner which follows the hierarchy. For example, in one embodiment, all view controllers in the root set are found and then the state for their views is restored and the view controllers state is also restored. For each view controller, all of their views have their state restored before the view controller view is restored.

In one embodiment, the second app (which updates state in response to the first app saving state) could be running, get a notification that state changed, and updated in response while it is running. (So it can update and synchronize state with the other app while it is running, it isn't limited to only do this when starting up).

An example:

App 1 is running and user is looking at a music playlist.

App 1 moves into the background and saves/transmits state to server.

App 2 is running in the background.

App 2 receives notification, from server, and moves to the same playlist as app 1.

App 2 continues running, user selects a song and it starts playing.

App 2 continues running, and user pauses song, and moves app to background, saves and transmits state to server.

App 1 receives notification from server, updates so same album and song is now selected.

App 1 returns back from background, song is showing, user can hit play and that song continues from same point.

FIG. 11 shows an example of data processing system 1100 which may be used with one or more embodiments of the present invention. For example in one embodiment, system 1100 may be implemented as a portable data processing device such as a smartphone or tablet (e.g., iPad) device or a laptop or an entertainment system and devices 101, 102 and server 205 can be implemented as shown in FIG. 11. The data processing system 1100 shown in FIG. 11 includes a processing system 1111, which may be one or more microprocessors or which may be a system on a chip (integrated circuit) and the system also includes memory 1101 for storing data and programs for execution by the processing system. The memory 1101 can store, for example, the software components described in conjunction with FIG. 3 or 4 and memory 1101 can be any known form of a machine readable non-transitory storage medium, such as semiconductor memory (e.g., flash; DRAM; SRAM; etc.) The system 1100 also includes an audio input/output subsystem 1105 which may include a microphone and a speaker for, for example, playing back music or providing telephone functionality through the speaker and microphone.

A display controller and display device 1109 can provide a visual user interface for the user; this interface may include a graphical user interface which is similar to that shown on a Macintosh computer when running OS X operating system software or iOS software on an iPhone or iPad. The system 1100 also includes one or more wireless transceivers 1103 to communicate with another data processing system; in one embodiment, network interface 104 or network interface 105 can be the one or more wireless transceivers 1103. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system. The system 1100 further can include one or more communications ports 1117 to communicate with another data processing system. The communications port may be a USB port, Firewire port, Bluetooth interface, a docking port, an Ethernet port, etc.

The data processing system 1100 also includes one or more input devices 1113 which are provided to allow a user to provide input to the system. These input devices may be a keypad or a keyboard or a touch panel or a multi-touch panel which is overlaid and integrated with a display device such as display device 1109. The data processing system 1100 can also include an optional input/output device which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 1100 may be a network computer or an embedded processing device within another device, or other types of data processing systems which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Examples of a portable media player are described in published U.S. Pat. No. 7,345,671 and U.S. published patent application number 2004/0224638, both of which are incorporated herein by reference.

In the foregoing specification, the invention has been described with reference to specific exemplary embodiments thereof. It will be evident that various modifications may be made thereto without departing from the broader spirit and scope of the invent on as set forth in the following claims. The specification and drawings are, accordingly, to be regarded in an illustrative sense rather than a restrictive sense.

What is claimed is:

1. A machine readable non-transitory storage medium storing executable program instructions which, when executed by a data processing system, cause the data processing system to perform a method comprising:

saving a user interface state of a first application on a first device, the user interface state being saved in response to an event and including the state of a set of user interface elements;

storing on the first device, the saved user interface state in a set of one or more data structures;

transmitting the set of one or more data structures and a device identifier of the first device and an identifier of the version of the first application through a network interface, on the first device, for delivery to a second device that has a second application, the second application being configured to recreate at least part of the user interface state in the second application on the second device wherein the transmitting is part of a synchronization process in which user content, in addition to the set of one or more data structures, is synchronized, through a network based backup storage service, between the first device and the second device, wherein the second application has some user interface elements that are the same as corresponding user interface elements in the first application but has other user interface elements that are different than the user interface elements in the first application.

2. The medium as in claim 1 wherein the event causes the saving and wherein the event is one of (a) terminating the first application in response to an operating system (OS) request on the first device, the OS request being caused by a low available memory state of the first device; or (b) being terminated by the OS as a result of the first device having a low available memory state; or (c) moving the first application to a background state from a front most application state.

3. The medium as in claim 1 wherein the first device and the second device have different form factors but each is configured to run a version of the same operating system.

4. The medium as in claim 1 wherein the first application uses a first set of identifiers in a first path list to selectively specify which user interface elements will have their state saved, and the second application uses a second set of identifiers in a second path list to selectively specify which user interface elements will have their state saved, and the first set of identifiers is different than the second set of identifiers.

5. The medium as in claim 4 wherein the user interface state is different than the default or initial user interface state that exists after the first application is initially launched.

6. The medium as in claim 5 wherein the user interface state comprises at least one of: (a) a scroll position of content within a view; (b) a zoom level; (c) an image rotation; (d) a tab selected from a set of multiple tabs; (e) whether a keyboard is displayed on a display device of the first device; (f) a selection of an item in a list; or (g) which user interface element has the input focus; and wherein the method further comprises:
  determining whether the first application is capable of running in a background state; and wherein the saving of the user interface state is in response to determining that the first application is capable of running in the background state.

7. The medium as in claim 6 wherein the first application uses an application framework, provided by the OS on the first device, to save the user interface state, and wherein the set of one or more data structures is maintained by the application framework and includes the path list which has the first set of identifiers in a scoped list which specifies a hierarchy of views.

8. The medium as in claim 7 further comprising:
  receiving, through the network interface at the first device, another set of one or more data structures from the second device, the another set of one or more data structures representing a user interface state of the second application, wherein the receiving occurs after the transmitting of the set of one or more data structures;
  setting another user interface state of the first application based on the another set of one or more data structures.

9. A machine implemented method comprising:
  saving a user interface state of a first application on a first device, the user interface state being saved in response to an event and including the state of a set of user interface elements;
  storing on the first device, the saved user interface state in a set of one or more data structures;
  transmitting the set of one or more data structures and a device identifier of the first device and an identifier of the version of the first application through a network interface, on the first device, for delivery to a second device that has a second application, the second application being configured to recreate at least part of the user interface state in the second application on the second device wherein the transmitting is part of a synchronization process in which user content, in addition to the set of one or more data structures, is synchronized, through a network based backup storage service, between the first device and the second device,
  wherein the second application has some user interface elements that are the same as corresponding user interface elements in the first application but has other user interface elements that are different than the user interface elements in the first application.

10. The method as in claim 9 wherein the event causes the saving and wherein the event is one of (a) terminating the first application in response to an operating system (OS) request on the first device, the OS request being caused by a low available memory state of the first device; or (b) being terminated by the OS as a result of the first device having a low available memory state; or (c) moving the first application to a background state from a front most application state.

11. The method as in claim 9 wherein the first device and the second device have different form factors but each is configured to run a version of the same operating system.

12. The method as in claim 9 wherein the first application uses a first set of identifiers in a first path list to selectively specify which user interface elements will have their state saved, and the second application uses a second set of identifiers in a second path list to selectively specify which user interface elements will have their state saved, and the first set of identifiers is different than the second set of identifiers.

13. The method as in claim 12 wherein the user interface state is different than the default or initial user interface state that exists after the first application is initially launched.

14. The method as in claim 13 wherein the user interface state comprises at least one of: (a) a scroll position of content within a view; (b) a zoom level; (c) an image rotation; (d) a tab selected from a set of multiple tabs; (e) whether a keyboard is displayed on a display device of the first device; (f) a selection of an item in a list; or (g) which user interface element has the input focus; and wherein the method further comprises:
  determining whether the first application is capable of running in a background state; and wherein the saving of the user interface state is in response to determining that the first application is capable of running in the background state.

15. The method as in claim 14 wherein the first application uses an application framework, provided by the OS on the first device, to save the user interface state, and wherein the set of one or more data structures is maintained by the application framework and includes the path list which has the first set of identifiers in a scoped list which specifies a hierarchy of views.

16. The method as in claim 15 further comprising:
  receiving, through the network interface at the first device, another set of one or more data structures from the second device, the another set of one or more data structures representing a user interface state of the second application, wherein the receiving occurs after the transmitting of the set of one or more data structures;
  setting another user interface state of the first application based on the another set of one or more data structures.

17. A data processing system comprising:
  means for saving a user interface state of a first application on a first device, the user interface state being saved in response to an event and including the state of a set of user interface elements;
  means for storing on the first device, the saved user interface state in a set of one or more data structures;
  means for transmitting the set of one or more data structures and a device identifier of the first device and an identifier of the version of the first application through a network interface, on the first device, for delivery to a second device that has a second application, the second application being configured to recreate at least part of the user interface state in the second application on the second device wherein the transmitting is part of a synchronization process in which user content, in addition to the set of one or more data structures, is synchronized, through a network based backup storage service, between the first device and the second device, wherein the second application has some user interface elements that are the same as corresponding user interface elements in the first application but has other user interface elements that are different than the user elements in the first application.

* * * * *